United States Patent [19]

Ohkawa et al.

[11] 4,365,047

[45] Dec. 21, 1982

[54] RESIN COMPOSITION FOR BONDING FOUNDRY SAND

[75] Inventors: Koue Ohkawa, Yokohama; Shin Fujii, Zama; Takashi Seino, Yokosuka, all of Japan

[73] Assignee: Mitsui Toatsu Chemicals, Inc., Tokyo, Japan

[21] Appl. No.: 154,908

[22] Filed: May 30, 1980

[30] Foreign Application Priority Data

Jun. 7, 1979 [JP] Japan ................................. 54-70620

[51] Int. Cl.$^3$ ............................................. C08L 67/06
[52] U.S. Cl. .................................. 525/447; 525/148; 525/27; 525/29; 525/144
[58] Field of Search ................ 525/447, 27, 444; 260/40 R; 523/148

[56] References Cited

U.S. PATENT DOCUMENTS 2,416,282 2/1947 Biggs ................................ 525/447

FOREIGN PATENT DOCUMENTS 51-29381 3/1976 Japan ................................ 525/447

*Primary Examiner*—J. Ziegler
*Attorney, Agent, or Firm*—Fisher, Christen & Sabol

[57] ABSTRACT

A crystalline unsaturated polyester composition for binding foundry sand, said composition comprising:
(A) 100 parts by weight of an unsaturated polyester resin which is a mixture of 100 parts by weight of a normally solid, substantially tack-free, crystalline unsaturated polyester and 0 to 50 parts by weight of an unsaturated prepolymer or monomer copolymerizable with said unsaturated polyester or both, and
(B) 0.1 to 10 parts by weight of a mixture of at least two of (1) a radical polymerization catalyst which requires a temperature of at least 70° C. but below 90° C. to obtain a half-period value of 10 hours, (2) a radical polymerization catalyst which requires a temperature of at least 90° C. but below 110° C. to obtain a half-period value of 10 hours and (3) a radical polymerization catalyst which requires a temperature of at least 110° C. but not exceeding 130° C. to obtain a half-period value of 10 hours.

7 Claims, No Drawings

RESIN COMPOSITION FOR BONDING FOUNDRY SAND

This invention relates to a resin composition for bonding foundry sand.

Phenolic resins are now in widespread use as binders for sand in the production of foundry molds. These resins, however, prove to be extremely unsatisfactory in labor hygiene and control of pollution because when heated during coating of sand, molding, and pouring, they give off toxic or malodorous gases. Furthermore, when such a phenolic resin is used in cores for aluminum casting, the disintegrability of the cores after casting is poor.

Investigations have therefore been made about the use of other materials such as unsaturated polyester resins as binders. When unsaturated polyester resins are used as binders for sand, the aforesaid defects can be remedied. But since these resins have essentially lower heat-resistant strength (hot strength) than phenolic resins, it is necessary to make up for the heat-resistant strength of the unsaturated polyester resins by including a larger amount of these resins in a resin-coated sand (to be referred to simply as a coated sand) than in the case of the phenolic resins. Certainly, this brings about an improvement in strength, but since blowholes or cavities tend to form by gases generated during pouring, ideal castings are difficult to obtain. Moreover, this leads to an increased cost of production.

It is an object of this invention to provide a novel composition for bonding of foundry sand, which is free from these defects.

According to this invention, there is provided a crystalline unsaturated polyester composition for binding foundry sand, said composition comprising:

(A) 100 parts by weight of an unsaturated polyester resin which is a mixture of 100 parts by weight of a normally solid, substantially tack-free, crystalline unsaturated polyester and 0 to 50 parts by weight, preferably 10 to 30 parts by weight, of an unsaturated prepolymer or monomer copolymerizable with said unsaturated polyester, or both, and (B) 0.1 to 10 parts by weight, or 0.5 to 5 parts by weight, preferably 1.0 to 3.0% by weight, of a mixture of at least two of (1) a radical polymerization catalyst which requires a temperature of at least 70° C. but below 90° C. to obtain a half-period value of 10 hours, (2) a radical polymerization catalyst which requires a temperature of at least 90° C. but below 110° C. to obtain a half-period value of 10 hours and (3) a radical polymerization catalyst which requires a temperature of at least 110° C. but not exceeding 130° C. to obtain a half-period value of 10 hours.

The crystalline unsaturated polyester used in this invention can be prepared from materials having symmetrical molecular structures, that is, from an unsaturated acid such as fumaric acid or mesaconic acid, a saturated acid such as terephthalic acid, dimethyl terephthalate, adipic acid, sebacic acid or succinic acid, and a glycol such as ethylene glycol, 1,3-propanediol, diethylene glycol, 1,4-butanediol, dipropylene glycol, neopentyl glycol, hydrogenated bisphenol A, 2,2-bis-[4-(hydroxyethoxy)phenyl]propane, and 2,2-bis[4-(hydroxypropoxy)phenyl]propane. Other materials may be used in amounts which do not impair the crystallinity of the unsaturated polyester. Examples of these materials are an unsaturated acid such as citraconic acid or itaconic acid, maleic anhydride a saturated acid such as phthalic acid, isophthalic acid, and tetrahydroanhydrophthalic acid, endomethylenetetrahydrophthalic anhydride, a glycol such as propylene glycol or 1,3-butanediol, and glycerol, trimethylol propane or the derivatives thereof.

Preferably, the crystalline unsaturated polyester is obtained by esterifying in a customary manner an acid component which is at least one unsaturated acid having a symmetrical molecular structure as exemplified hereinabove or a mixture thereof with a minor amount of a saturated acid and a glycol component which is at least one glycol having a symmetrical molecular structure as exemplified hereinabove or a mixture thereof with a minor amount of a glycol having an asymmetric molecular structure. A polymerization inhibitor, such as p-benzoquinone, hydroquinone or catechol, is added in an amount of 100 to 1000 ppm to the reaction system.

Examples of suitable prepolymers or monomers crosslinkable and copolymerizable with the aforesaid polyester include styrene, divinylbenzene, vinyltoluene, α-methylstyrene, diallyl phthalate prepolymer, diallyl isophthalate prepolymer, ethylene glycol dimethacrylate, diethylene glycol dimethacrylate, neopentyl glycol dimethacrylate, trimethylolpropane trimethacrylate, diallyl phthalate, diallyl isophthalate, triallyl cyanurate, triallyl isocyanurate, triallyl trimellitate, diacetone acrylamide and N-methylol acrylamide. The unsaturated polyester resin (A) is obtained by adding 0 to 50 parts by weight, preferably 10 to 30 parts by weight, of at least one such prepolymer or monomer to 100 parts of the crystalline unsaturated polyester. If the amount of the prepolymer or monomer is more than 30% by weight, a coated sand produced by using the final product shows marked tackiness, and the bulk density of the coated sand decreases. Hence, the strength of a molded product produced from it decreases.

Examples of the catalyst which requires a temperature of at least 70 but below 90° C. to obtain a half-period vallue of 10 hours are t-butyl peroxy-2-ethylhexanoate, benzoyl peroxide and t-butyl peroxyisobutyrate. Examples of the catalyst which requires a temperature of at least 90° C. but below 110° C. to obtain the same half-period value are t-butyl peroxylaurate, cyclohexanone peroxide, t-butyl peroxybenzoate and di-t-butyl diperoxyphthalate. Examples of the catalyst which requires a temperature of 110° to 130° C. to obtain the same half-period value include dicumyl peroxide, t-butylcumyl peroxide, t-butyl hydroperoxide and di-t-butyl peroxide.

The half-period value is measured by a procedure which involves preparing a solution having a peroxide concentration of 0.1 to 0.2 mole/liter using a solvent relatively inert to radicals generated, sealing the solution into a glass tube purged with nitrogen gas, and heat decomposing it at a predetermined temperature.

The catalyst mixture (B) consisting of at least two of the radical polymerization catalysts (1), (2) and (3) is added in an amount of 0.1 to 10 parts by weight, or 0.5 to 5 parts by weight, preferably 1 to 3 parts by weight, per 100 parts by weight of the crystalline unsaturated polyester resin (A). If the amount of the catalyst mixture (B) is less than 0.1 part by weight, molds and cores of favorable strengths cannot be obtained by using the resulting composition. If the amount of the catalyst mixture (B) exceeds 10 parts by weight, no increase in strength corresponding to an increase in the amount of the catalyst mixture (B) can be obtained, and moreover, it is economically disadvantageous. Although there is no particular restriction on the ratio between the constituent catalysts [at least two of the catalysts (1), (2) and (3)] in the catalyst mixture (B), it preferably contains at least 0.1% by weight of a constituent catalyst which is the smallest in amount.

If only one type of the three catalysts is used, localized excessive solidification (at a slender or thin portion) or localized insufficient solidification (at a thick portion) tends to occur in molds and cores of complex profiles obtained by using the final product when such molds and cores are heated at a uniform temperature. Consequently, the yield rate of molds and cores of complex profiles decreases. To avoid this inconvenience, it may be possible to maintain a low mold temperature at portions which tend to undergo excessive solidification, and a high mold temperature at portions which tend to undergo insufficient solidification. It is extremly difficult, however, and economically disadvantageous, to control the mold temperature in such a manner. When molds and cores of complex profiles are to be produced, use of a catalyst composed of the aforesaid three types of catalysts (1), (2) and (3) is effective.

A silane coupling agent may be added to the resin composition of this invention in order to increase the strength of a mold or core after molding. Suitable silane coupling agents are represented by the general formula:

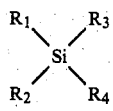

wherein $R_1$ represents an organic functional group containing at least one group selected from the class consisting of alkenyl, alkenylphenylalkyl, acryloxyalkyl, methacryloxyalkyl, glycidoxyalkyl, epoxycyclohexylalkyl and haloalkyl groups, and $R_2$, $R_3$ and $R_4$ represent a hydrolyzable group selected from the group consisting of alkoxy groups, alkoxyethoxy groups, acetoxy groups and halogen atoms. Examples of the silane coupling agent are γ-chloropropyltrimethoxy silane, vinyltrichlorosilane, vinyl-tris(β-methoxyethoxy)silane, γ-methacryloxypropyltrimethoxysilane, β-(3,4-epoxycyclohexyl)-ethyltrimethoxysilane, γ-glycidoxypropyltrimethoxy-silane, γ-mercaptopropyltrimethoxysilane, γ-amino-propyltriethoxysilane, N-(β-aminoethyl)-γ-aminopropyltrimethoxysilane, and γ-ureidopropyltriethoxysilane. At least one of these coupling agents is added in an amount of 0.1 to 10 parts by weight, preferably 0.5 to 5 parts by weight, per 100 parts by weight of the unsaturated polyester resin (A). If the amount of the silane coupling agent is below 0.1 part by weight, no effect of increasing strength by its addition is produced. If it is added in an amount exceeding 10 parts by weight, no effect of increasing strength corresponding to an increase in its amount is obtained, and this is economically disadvantageous.

In using the composition of this invention, it is permissible to add known flowability-imparting agents for coated sand, such as waxes, higher fatty acids or higher fatty acid salts. Other additives, such as agents for imparting disintegrability, crystallization promotors or thickeners, may also be incorporated.

Use of the resin composition of this invention as a binder for shell molds brings about the advantage that no toxic or malodorous gases are generated during the operation, molds and cores of complex profiles can be solidified uniformly and obtained in a good yield rate, occurrence of blowholes or cavities at the time of pouring is reduced and castings are obtained in a good yield, and that cores prepared by using the resin composition of this invention has superior disintegrability after pouring.

The following Examples illustrate the present invention more specifically without any intention of limiting the scope of the invention thereby.

EXAMPLE 1

A 2-liter four-necked flask was charged with 1137.5 g of fumaric acid, 33.2 g of isophthalic acid and 651.7 g of ethylene glycol, and they were esterified in a customary manner to afford an unsaturated polyester having an acid value of 25.

The unsaturated polyester was cooled to 140° C., and 95 parts by weight of the cooled unsaturated polyester was mixed with 10 parts by weight of diallyl phthalate, 2 parts by weight of γ-methacryloxypropyl trimethylsilane (A-174, a tradename for a product of Nippon Unicar Co., Ltd.) and 0.8 part by weight of ultrafine silicic anhydride (Aerosil #200, a tradename for a product of Nippon Aerosil Co., Ltd.). The mixture was cooled to room temperature to crystallize and solidify it, followed by pulverization to a size smaller than 10 mesh to obtain a sample I.

Coated sand was produced in the following manner using sample I. One thousand grams of Nikko silica sand #5 heated at 170° C. was taken into a universal mixer-stirrer (5DWM, a tradename for a product of Shinagawa Seisakusho), and was mixed with 29.5 g of sample I to melt-adhere the resin to the surface of the sand. Subsequently, while maintaining the temperature of the sand at 60° to 100° C., a solution of 0.35 g of t-butyl peroxy-2-ethylhexanoate, 0.35 g of dicumyl peroxide and 0.35 g of t-butyl peroxybenzoate in 5.5 g of acetone was mixed with the sand.

COMPARATIVE EXAMPLE 1

In the same way as in Example 1, 1000 g of Nikko silica sand #5 heated at 170° C. was taken into a universal mixer-stirrer (5DWM, a tradename), and mixed with 29.5 g of sample I. Furthermore, a solution of 1.05 g of t-butyl peroxy-2-ethylhexanoate in 5.5 g of acetone was mixed and dispersed to form coated sand.

COMPARATIVE EXAMPLE 2

Coated sand was produced in the same way as in Comparative Example 1 except that 1.05 g of t-butyl p-oxybenzoate was used instead of the catalyst used in Comparative Example 1.

COMPARATIVE EXAMPLE 3

Coated sand was produced in the same way as in Comparative Example 1 except that 1.05 g of dicumyl peroxide was used instead of the catalyst used in Comparative Example 1.

EXAMPLE 2

Coated sand was produced in the same way as in Example 1 except that 0.525 g of t-butyl peroxy-2-ethylhexanoate and 0.525 g of dicumyl peroxide were used instead of the catalysts used in Example 1.

EXAMPLE 3

Coated sand was produced in the same way as in Example 1 except that 0.525 g of t-butyl peroxybenzoate and 0.525 g of dicumyl peroxide were used instead of the catalysts used in Example 1.

TEST EXAMPLE 1

Each of the coated sands obtaned in Examples 1 to 3 and Comparative Examples 1 to 3 was molded under heat for 40 seconds in each of molds (kept at a temperature of 250° C.) having a size of 10 mm$\phi \times$ 80 mm, 20 mm$\phi \times$ 150 mm, and 30 mm$\phi \times$ 150 mm, respectively. The flexural strengths and bulk densities of the resulting test pieces were measured at room temperature. The results are shown in Table 1.

TABLE 1

| Example (Ex.) or Comparative Example (CEx.) | Types of catalyst(*) | Flexural strength (FS, kg/cm²) and bulk density (BD, g/cm³) | Diameters of the test samples | | |
|---|---|---|---|---|---|
| | | | 10 mm | 20 mm | 30 mm |
| Ex. 1 | Three types (70–90° C., 90–110° C., 110–130° C.) | FS BD | 75 1.45 | 71 1.43 | 65 1.44 |
| CEx. 1 | One type (70–90° C.) | FS BD | 35 1.41 | 50 1.40 | 60 1.44 |
| CEx. 2 | One type (90–110° C.) | FS BD | 60 1.44 | 75 1.42 | 40 1.43 |
| CEx. 3 | One type (110–130° C.) | FS BD | 75 1.44 | 30 1.41 | 20 1.40 |
| Ex. 2 | Two types (70–90° C., 110–130° C.) | FS BD | 60 1.42 | 66 1.43 | 50 1.41 |
| Ex. 3 | Two types (90–100° C., 110–130° C.) | FS BD | 65 1.44 | 75 1.42 | 45 1.43 |

(*)Shown by the temperatures required to obtain a half-period value of 10 hours.

It is seen from the results shown in Table 1 that if only one type of catalyst is used, molded articles of different diameters and having uniform strength are difficult to obtain. This is because each catalyst has its own optimal activating temperature, and if this temperature is not kept, sufficient strength cannot be obtained because of the excessive reactivity or of the lack of reactivity. On the other hand, at a portion having a large diameter in the test piece, the temperature rise during molding is small, and at a portion having a small diameter in the test piece, the temperature rise during molding is large. In contrast, since the composition of this invention includes two or three types of catalyst, it is free from this defect.

EXAMPLE 4

A 2-liter four-necked flask was charged with 1102.6 g of fumaric acid, 83.1 g of terephthalic acid, 614.5 g of ethylene glycol and 147.6 g of neopentyl glycol, and they were esterified in a customary manner to afford an unsaturated polyester having an acid value of 30. The resulting unsaturated polyester was cooled to 135° C., and 90 parts by weight of the cooled unsaturated polyester was mixed with 10 parts by weight of diallyl phthalate, 3 parts by weight of vinyl tris(62-methoxyethoxy)silane (A-172, a tradename for a product of Nippon Unicar Co., Ltd.) and 0.8 part by weight of ultrafine silicic anhydride (Aerosil #200, a tradename for a product of Nippon Aerosil Co., Ltd.). The mixture was cooled to room temperature to crystallize and solidify it, followed by pulverizing to a size smaller than 10 mesh to obtain a sample II.

Coated sand was produced in the same way as in Example 1 using sample II. Specifically, 100 g of Nikko silica sand #5 heated at 170° C. was taken into a universal mixer-stirrer (5DWM, a tradename), and mixed with 31.1 g of sample II to melt-adhere the resin to the surface of the sand. Furthermore, while maintaining the temperature of the sand at 60° to 100° C., a solution of 0.2 g of t-butyl peroxy-2-ethylhexanoate, 0.2 g of t-butyl peroxylaurate and 0.2 g of t-butyl hydroperoxide in 3.9 g of acetone was mixed and dispersed to produce coated sand.

EXAMPLE 5

In the same way as in Example 4, 1000 g of Nikko silica sand #5 heated at 170° C. was taken into a universal mixer-stirrer (5DWM, a tradename), and mixed with 31.1 g of sample II to melt-adhere the resin to the surface of the sand. A solution of 0.3 g of t-butyl peroxy-2-ethylhexanoate and 0.3 g of t-butyl peroxylaurate in 3.9 g of acetone was mixed and dispersed to produce coated sand.

EXAMPLE 6

Coated sand was produced in the same way as in Example 4 except that 0.3 g of t-butyl peroxy-2-ethylhexanoate and 0.3 g of t-butyl hydroperoxide were used instead of the catalysts used in Example 4.

EXAMPLE 7

Coated sand was produced in the same way as in Example 4 except that 0.3 g of t-butyl hydroperoxide and 0.3 g of t-butyl peroxylaurate were used as the catalysts used in Example 4.

COMPARATIVE EXAMPLE 4

Coated sand was produced in the same way as in Example 4 except that 0.6 g of t-butyl hydroperoxide was used instead of the catalysts used in Example 4.

TEST EXAMPLE 2

The same tests as in Test Example 1 was conducted except that the mold temperature was changed to 260° C. The results are shown in Table 2.

TABLE 2

| Example (Ex.) or Comparative Example (CEx.) | Types of catalyst(*) | Flexural strength (FS, kg/cm²) and bulk density (BD, g/cm³) | Diameter of the test samples | | |
|---|---|---|---|---|---|
| | | | 10 mm | 20 mm | 30 mm |
| Ex. 4 | Three types (70–90° C., 90–110° C., 110–130° C.) | FS<br>BD | 73<br>1.43 | 72<br>1.41 | 68<br>1.40 |
| Ex. 5 | Two types (70–90° C., 90–110° C.) | FS<br>BD | 43<br>1.40 | 60<br>1.44 | 73<br>1.45 |
| Ex. 6 | Two types (70–90° C., 110—130° C.) | FS<br>BD | 55<br>1.46 | 65<br>1.42 | 60<br>1.43 |
| Ex. 7 | Two types (90–110° C., 110–130° C.) | FS<br>BD | 65<br>1.39 | 65<br>1.44 | 40<br>1.43 |
| CEx. 4 | One type (110–130° C.) | FS<br>BD | 73<br>1.44 | 32<br>1.46 | 17<br>1.45 |

(*)The same as the footnote to Table 1.

What we claim is:

1. A resin composition for binding foundry sand, said composition comprising
   (A) 100 parts by weight of a binder comprising a normally solid, substantially tack-free, crystalline unsaturated polyester, and
   (B) 0.1 to 10 parts by weight of a mixture of at least two of three types of radical polymerization catalysts, the first type being a radical polymerization catalyst which requires a temperature of at least 70° C. but below 90° C. to obtain a half-period value of 10 hours, the second type being a radical polymerization catalyst which requires a temperature of at least 90° C. but below 110° C. to obtain a half-period value of 10 hours and the third type being a radical polymerization catalyst which requires a temperature of at least 110° C. but not exceeding 130° C. to obtain a half-period value of 10 hours.

2. The composition of claim 1, which comprises 100 parts by weight of said binder and 0.5 to 5 parts by weight of said mixture of radical polymerization catalysts.

3. The composition of claim 1 wherein the difference in said required temperature of at least two of said catalyst types is at least about 10° C.

4. The composition of claim 3 wherein said difference is at least about 12° C.

5. The composition of claim 1 wherein the difference in said required temperatures of said first and second catalyst types is at least about 18° C. and wherein the difference in said required temperatures of said second and third catalyst types is at least about 12° C.

6. The composition of claim 1 wherein the first catalyst type is selected from the group consisting of t-butyl peroxy-2-ethylhexanoate, benzoyl peroxide and t-butyl peroxyisobutyrate, the second catalyst type is selected from the group consisting of t-butyl peroxylaurate, cyclohexanone peroxide, t-butyl peroxybenzoate and di-t-butyl diperoxyphthalate, and the third catalyst type is selected from the group consisting of dicumyl peroxide, t-butylcumyl peroxide, t-butyl hydroperoxide and di-t-butyl peroxide.

7. The composition of claim 1, 2, 3, or 6 wherein the amount of each catalyst in said mixture of catalysts is at least 0.1% by weight of the catalyst mixture.